(12) United States Patent
Sato (10) Patent No.: US 7,386,278 B2
(45) Date of Patent: Jun. 10, 2008

(54) MULTI-BAND MOBILE COMMUNICATION DEVICE

(75) Inventor: Naotaka Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 10/344,431

(22) PCT Filed: Jun. 12, 2002

(86) PCT No.: PCT/JP02/05850

§ 371 (c)(1),
(2), (4) Date: Jul. 28, 2003

(87) PCT Pub. No.: WO02/101945

PCT Pub. Date: Dec. 19, 2002

(65) Prior Publication Data

US 2004/0043727 A1    Mar. 4, 2004

(30) Foreign Application Priority Data

Jun. 12, 2001  (JP) .............................. 2001-177619

(51) Int. Cl.
*H04B 1/38* (2006.01)
*H04B 1/44* (2006.01)
*H04B 1/40* (2006.01)

(52) U.S. Cl. .............................. 455/73; 455/78; 455/86
(58) Field of Classification Search .................. 455/73, 455/78, 86, 424, 553.1, 318, 319
See application file for complete search history.

(56) References Cited

U.S. PATENT DOCUMENTS

| 5,794,159 | A | * | 8/1998 | Portin ........................ 455/553.1 |
| 5,894,496 | A | * | 4/1999 | Jones ........................... 455/126 |
| 6,014,551 | A | * | 1/2000 | Pesola et al. .................... 455/86 |
| 6,118,984 | A | * | 9/2000 | Yu-Hong ........................ 455/76 |
| 6,128,508 | A | * | 10/2000 | Francisco et al. .......... 455/552.1 |
| 6,175,746 | B1 | * | 1/2001 | Nakayama et al. ........ 455/552.1 |
| 6,208,844 | B1 | * | 3/2001 | Abdelgany ..................... 455/82 |
| 6,438,358 | B1 | * | 8/2002 | Higuchi ........................ 455/84 |
| 6,466,768 | B1 | * | 10/2002 | Agahi-Kesheh et al. ....... 455/78 |
| 6,516,184 | B1 | * | 2/2003 | Damgaard et al. ............. 455/86 |
| 6,609,010 | B1 | * | 8/2003 | Dolle et al. ............... 455/552.1 |
| 6,621,853 | B1 | * | 9/2003 | Ku ............................... 375/132 |
| 6,658,237 | B1 | * | 12/2003 | Rozenblit et al. .............. 455/83 |
| 6,690,949 | B1 | * | 2/2004 | Shamlou et al. ............. 455/557 |
| 6,754,508 | B1 | * | 6/2004 | Pau .......................... 455/552.1 |
| 2002/0193140 | A1 | * | 12/2002 | Behrens et al. .............. 455/553 |

(Continued)

FOREIGN PATENT DOCUMENTS

JP          5-244032          9/1993

(Continued)

*Primary Examiner*—Nay Maung
*Assistant Examiner*—Andrew Wendell
(74) *Attorney, Agent, or Firm*—Frommer Lawrence & Haug LLP; William S. Frommer; Paul A. Levy (57) ABSTRACT

Disclosed is a communication apparatus having a small-scale circuit used for modulation. A common transmission image rejection mixer (56) supplies transmission modulation frequencies to a plurality of quadrature modulators (23) (G, D, P, W). Accordingly, it is unnecessary to prepare the transmission image rejection mixer (56) for transmission signal types, makes it possible to prevent the circuit scale from increasing.

1 Claim, 9 Drawing Sheets

U.S. PATENT DOCUMENTS

2004/0131105 A1* 7/2004 Kegasa et al. ............... 375/130
2005/0164733 A1* 7/2005 Sato ........................ 455/553.1

FOREIGN PATENT DOCUMENTS

| JP | 2000-165261 | 6/2000 |
| JP | 2000-269834 | 9/2000 |
| JP | 2001-505384 | 4/2001 |
| WO | WO 99/01933 | 1/1999 |
| WO | WO 99/62178 | 12/1999 |

* cited by examiner

MULTI-BAND MOBILE COMMUNICATION DEVICE

TECHNICAL FIELD

The present invention relates to a multiband mobile communication apparatus in compliance with various mobile communication systems such as GSM (Global System for Mobile Communications), DCS (Digital Cellular System), PCS (Personal Communications Service), and UMTS (Universal Mobile Telecommunications System).

BACKGROUND ART

A mobile communication terminal such as a cellular phone modulates quadrature baseband signals I and Q for transmission. A local oscillator supplies a frequency used for the modulation via an image rejection mixer.

In Europe, for example, a cellular phone is requested for transmission correspondingly to different communication systems such as GSM, DCS, PCS, and UMTS. These communication systems use different frequencies for transmission. Consequently, the local oscillator and the image rejection mixer are needed for each communication system.

However, providing each communication system with the local oscillator and the image rejection mixer may increase the circuit scale of the mobile communication terminal.

It is therefore an object of the present invention to provide a communication apparatus having a small-scale circuit used for modulation.

DISCLOSURE OF THE INVENTION

The present invention relates to a communication apparatus. The communication apparatus according to the present invention comprises a plurality of transmission modulation means, a first local oscillation means, a second local oscillation means, and a transmission modulation frequency output means.

The transmission modulation means is provided for each transmission signal type and modulates a transmission signal based on a transmission modulation frequency. A first local oscillation means generates a first signal within a specified range of frequencies. A second local oscillation means generates a second signal within a specified range of frequencies. Based on the first and second signals, the transmission modulation frequency output means supplies the transmission modulation frequency to the transmission modulation means.

The common transmission modulation frequency output means supplies a transmission modulation frequency to a plurality of transmission modulation means. This eliminates the need for providing the transmission modulation frequency output means correspondingly to a transmission signal type, preventing the circuit scale from increasing.

Since the transmission modulation frequency output means provides the transmission modulation frequency, the first and second signals' frequencies need not correspond to those specified for the transmission signal types. This makes it possible to narrow a range of changing frequencies for the first and second signals, preventing the circuit scale of the first local oscillation means and the second local oscillation means from increasing.

It is desirable to further provide the communication apparatus according to the present invention with a plurality of reception demodulation means, a fixed local oscillation means, and a reception demodulation frequency output means.

The reception demodulation means is provided for each reception signal type and demodulates a reception signal based on the reception demodulation frequency. The fixed local oscillation means generates a fixed frequency signal having specified frequency. The reception demodulation frequency output means provides a reception demodulation frequency to the reception demodulation means based on output from the first local oscillation means and the fixed frequency signal.

The common reception demodulation frequency output means supplies the reception demodulation frequency to a plurality of reception demodulation means. In addition, the reception demodulation frequency output means uses a reception local oscillation means used by the transmission modulation frequency output means. Since the transmission modulation frequency output means and the reception demodulation frequency output means commonly use the reception local oscillation means, it is unnecessary to provide the reception local oscillation means for transmission and reception, preventing the circuit scale from increasing.

Moreover, the communication apparatus according to the present invention can be configured as follows. Another communication apparatus according to the present invention comprises a fixed local oscillation means, a transmission modulation means, a third local oscillation means, and a transmission signal output means.

The fixed local oscillation means generates a fixed frequency signal having specified frequency. The transmission modulation means modulates a transmission signal based on the fixed frequency signal frequency. A third local oscillation means generates a third signal within a specified range of frequencies. The transmission signal output means changes a transmission modulation means' output frequency to a sum or difference between the third signal's frequency and the transmission modulation means' output frequency, and outputs the frequency for each transmission signal type.

The transmission signal output means need not be provided for each transmission signal type, preventing the circuit scale from increasing.

Further, the transmission signal output means adjusts the transmission signal frequency to a frequency specified for each transmission signal type. Frequencies of the third signal and an output from the transmission modulation means need not correspond to those specified for transmission signal types. This makes it possible to narrow a range of changing frequencies for the third signal, preventing the circuit scale of the third local oscillation means.

It is desirable to further provide the communication apparatus according to the present invention with a plurality of reception demodulation means, a fourth local oscillation means, and a reception demodulation frequency output means.

The reception demodulation means is provided for each reception signal type and demodulates a reception signal based on the reception demodulation frequency. The fourth local oscillation means generates a fourth signal within a specified range of frequencies. Based on an output from the fourth local oscillation means and the fixed frequency signal, the reception demodulation frequency output means supplies the reception demodulation frequency to the reception demodulation means.

The common reception demodulation frequency output means supplies the reception demodulation frequency to a plurality of reception demodulation means. In addition, the reception demodulation frequency output means uses the fixed local oscillation means used by the transmission modulation frequency output means. Since the transmission modulation frequency output means and the reception demodulation frequency output means commonly use the fixed local oscillation means, it is unnecessary to independently provide the fixed local oscillation means, preventing the circuit scale from increasing.

BEST MODE FOR CARRYING OUT THE INVENTION

Embodiments of the present invention will be described in further detail with reference to the accompanying drawings.

First Embodiment

Figure 1:
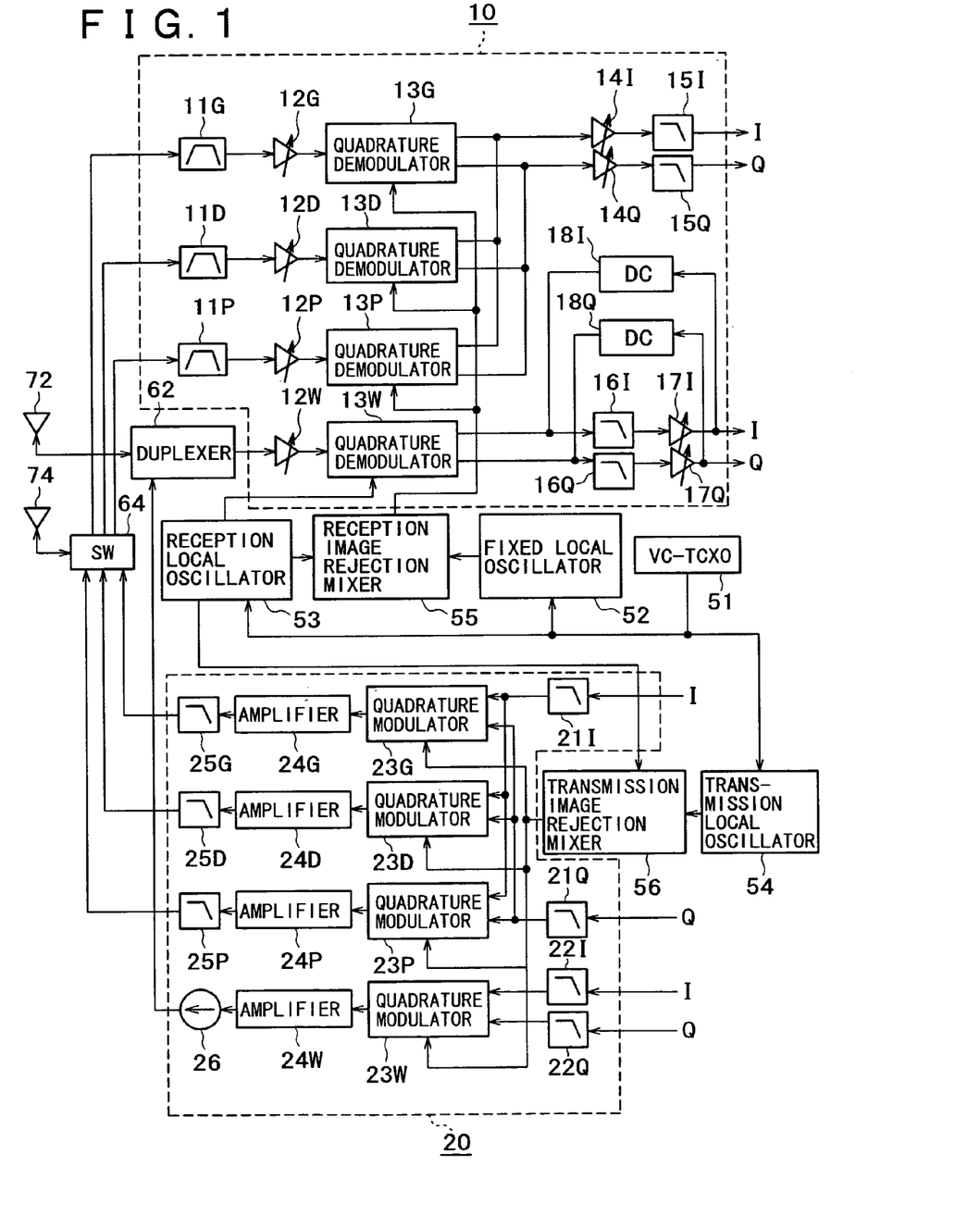
FIG. 1 is a block diagram showing a configuration of a transmission/reception apparatus 1 according to a first embodiment of the present invention.

FIG. 1 is a block diagram showing a configuration of a transmission/reception apparatus 1 according to the first embodiment of the present invention. The transmission/reception apparatus 1 comprises a reception section 10, a transmission section 20, a VC-TCXO 51, a fixed local oscillator block 52, a reception local oscillator (first local oscillation means) 53, a transmission local oscillator (second local oscillation means) 54, a reception image rejection mixer (reception demodulation frequency output means) 55, a transmission image rejection mixer (transmission modulation frequency output means) 56, a duplexer 62, a high-frequency switch 64, a UMTS antenna 72, and a triple-band antenna 74.

The triple-band antenna 74 is used to transmit or receive GSM, DCS, and PCS signals. The high-frequency switch 64 outputs the GSM, DCS, and PCS signals received by the triple-band antenna 74 to the reception section 10 and outputs the GSM, DCS, and PCS signals output from the transmission section 20 to the triple-band antenna 74.

The UMTS antenna 72 is used to transmit or receive a UMTS (WCDMA) signal. The duplexer 62 outputs the UMTS (WCDMA) signal received by the UMTS antenna 72 to the reception section 10 and outputs the UMTS (WCDMA) signal output from the transmission section 20 to the UMTS antenna 72. That is to say, the duplexer 62 separates a transmission signal from a reception signal. Since UMTS (WCDMA) assumes continuous transmission and reception, the duplexer 62 is used instead of a switch.

The reception section 10 comprises a band pass filter (BPF) 11 (G, D, P), a variable gain low noise amplifier 12 (G, D, P, W), a quadrature demodulator 13 (G, D, P, W) (reception demodulation means), a variable gain amplifier 14 (I, Q), an LPF 15 (I, Q), an LPF 16 (I, Q), a variable gain amplifier 17 (I, Q), and a DC amplifier 18 (I, Q).

The BPF 11G eliminates an interference signal except the frequency band used for GSM from a signal output from the high-frequency switch 64, and outputs the signal to the variable gain low noise amplifier 12G. The BPF 11D eliminates an interference signal except the frequency band used for DCS from a signal output from the high-frequency switch 64, and outputs the signal to the variable gain low noise amplifier 12D. The BPF 11P eliminates an interference signal except the frequency band used for PCS from a signal output from the high-frequency switch 64, and outputs the signal to the variable gain low noise amplifier 12P.

The variable gain low noise amplifier 12G amplifies an output from the BPF 1G and supplies the output to the quadrature demodulator 13G. The variable gain low noise amplifier 12D amplifies an output from the BPF 11D and supplies the output to the quadrature demodulator 13D. The variable gain low noise amplifier 12P amplifies an output from the BPF 11P and supplies the output to the quadrature demodulator 13P. The variable gain low noise amplifier 12W amplifies an output from the duplexer 62 and supplies the output to the quadrature demodulator 13W. The variable gain low noise amplifier 12 (G, D, P, W) generates a small noise during amplification.

Figure 2A:
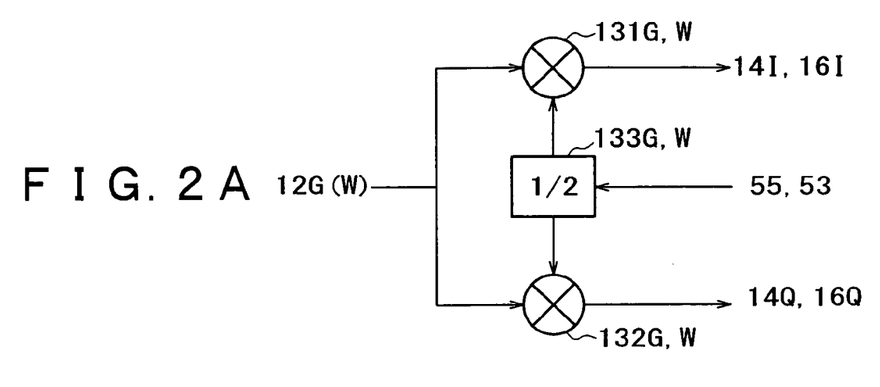
FIG. 2A shows a configuration of a quadrature demodulator 13G or 13W.
Figure 2B:
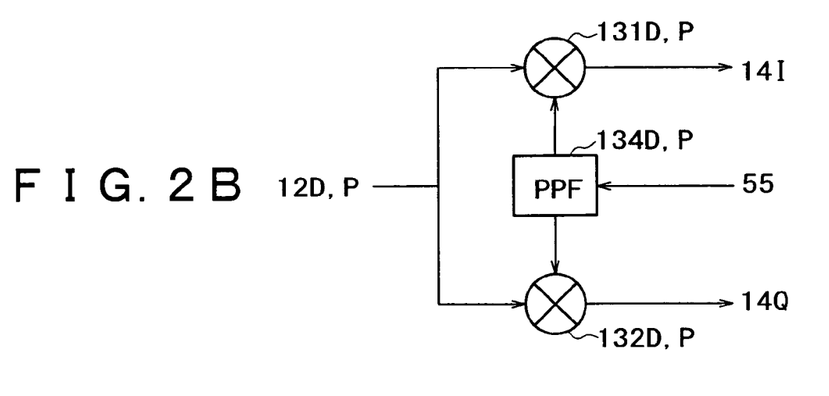
FIG. 2B shows a configuration of a quadrature demodulator 13D or 13P.

The quadrature demodulator 13 (G, D, P, W) quadrature-demodulates an output from the variable gain low noise amplifier 12 (G, D, P, W). FIGS. 2A and 2B illustrate configurations of the quadrature demodulator 13 (G, D, P, W).

An internal configuration of the quadrature demodulator 13G will now be described with reference to FIG. 2A. The quadrature demodulator 13G includes a frequency mixer 131G, a frequency mixer 132G, and a ½ divider 133G. The frequency mixers 131G and 132G respectively mix outputs from the variable gain low noise amplifier 12G and the ½ divider 133G and supply them to the variable gain amplifiers 14I and 14Q. The ½ divider 133G divides an output from the reception image rejection mixer 55 for output. At this time, the ½ divider 133G supplies the frequency mixers 131G and 132G with output signals that are orthogonal to each other. The variable gain low noise amplifier 12G and the ½ divider 133G generate the same output frequency. This can provide the direct demodulation (direct conversion) method.

An internal configuration of the quadrature demodulator 13W will now be described with reference to FIG. 2A. The quadrature demodulator 13W includes a frequency mixer 131W, a frequency mixer 132W, and a ½ divider 133W. The frequency mixers 131W and 132W respectively mix outputs from the variable gain low noise amplifier 12W and the ½ divider 133W and supply them to the LPFs 16I and 16Q. The ½ divider 133W divides an output from the reception image rejection mixer 53 for output. At this time, the ½ divider 133W supplies the frequency mixers 131W and 132W with output signals that are orthogonal to each other. The variable gain low noise amplifier 12W and the ½ divider 133W generate the same output frequency. This can provide the direct demodulation (direct conversion) method.

An internal configuration of the quadrature demodulator 13D will now be described with reference to FIG. 2B. The quadrature demodulator 13D includes a frequency mixer 131D, a frequency mixer 132D, and a polyphase filter 134D. The frequency mixers 131D and 132D respectively mix outputs from the variable gain low noise amplifier 12D and the polyphase filter 134D and supply them to the variable gain amplifiers 14I and 14Q. The polyphase filter 134D receives an output from the reception image rejection mixer 55 and supplies the frequency mixers 131D and 132D with output signals that are orthogonal to each other. The variable gain low noise amplifier 12D and the polyphase filter 134D generate the same output frequency. This can provide the direct demodulation (direct conversion) method.

An internal configuration of the quadrature demodulator 13P will now be described with reference to FIG. 2B. The quadrature demodulator 13P includes a frequency mixer 131P, a frequency mixer 132P, and a polyphase filter 134P. The frequency mixers 131P and 132P respectively mix outputs from the variable gain low noise amplifier 12P and the polyphase filter 134P and supply them to the variable gain amplifiers 14I and 14Q. The polyphase filter 134P receives an output from the reception image rejection mixer 55 and supplies the frequency mixers 131P and 132P with output signals that are orthogonal to each other. The variable gain low noise amplifier 12P and the polyphase filter 134P generate the same output frequency. This can provide the direct demodulation (direct conversion) method.

The variable gain amplifier 14I amplifies outputs from the frequency mixers 131G, 131D, and 131P of the quadrature demodulators 13G, 13D, and 13P and supplies them to the LPF 15I. The variable gain amplifier 14Q amplifies outputs from the frequency mixers 132G, 132D, and 132P of the quadrature demodulators 13G, 13D, and 13P and supplies them to the LPF 15Q. The LPFs 15I and 15Q eliminate interference signals from outputs of the variable gain amplifiers 14I and 14Q, and output the quadrature baseband signals I and Q. For example, interference signals maybe found in the bands such as adjacent channels except frequencies to be used.

The variable gain amplifiers 14I and 14Q and the variable gain low noise amplifiers 12G, 12D, and 12P can control gains. This makes it possible to provide control to allow a uniform amplitude for an input signal to an A/D converter included in a digital processing circuit (not shown) for processing the quadrature baseband signals I and Q. Control on an input signal amplitude for the A/D converter is needed to always maintain a constant input dynamic range of the A/D converter.

The LPF 16I removes an interference signal from an output of the frequency mixer 131W of the quadrature demodulator 13W and supplies the output to the variable gain amplifier 17I. The LPF 16Q removes an interference signal from an output of the frequency mixer 132W of the quadrature demodulator 13W and supplies the output to the variable gain amplifier 17Q. The LPFs 16I and 16Q remove interference signals from an output of the quadrature demodulator 13W for output. The variable gain amplifiers 17I and 17Q amplify outputs of the LPFs 16I and 16Q and output the quadrature baseband signals I and Q.

The DC amplifier 18I amplifies an output of the variable gain amplifier 17I and supplies it to an input of the LPF 16I. The DC amplifier 18Q amplifies an output of the variable gain amplifier 17Q and supplies it to an input of the LPF 16Q. This means supplying an output of the quadrature demodulator 13W with DC feedback from the DC amplifiers 18I and 18Q. The DC feedback is effective for canceling a DC offset.

The following describes why the DC feedback is supplied to an output of the quadrature demodulator 13W while no DC feedback is supplied to outputs of the quadrature demodulators 13G, 13D, and 13P. The DC feedback works so as to remove low pass frequencies. Normally, a low pass cut-off frequency is approximately 2 kHz. The quadrature demodulator 13W processes a WCDMA signal. The WCDMA signal has a 2 MHz band and is sufficiently wider than GSM, DCS, and PCS bands according to the TDMA method. A lack of the low pass frequency as high as 2 kHz in the GSM, DCS, and PCS disables normal reception. Since the WCDMA signal has the wide band, however, information included in the signal is not lost significantly due to a lack of the 2 kHz low pass frequency. Therefore, normal reception is available if the DC feedback is supplied to an output of the quadrature demodulator 13W.

The variable gain amplifiers 16I and 16Q and the variable gain low noise amplifier 12W can control gains. This makes it possible to provide control to allow a uniform amplitude for an input signal to an A/D converter included in the digital processing circuit (not shown) for processing the quadrature baseband signals I and Q. Control on an input signal amplitude for the A/D converter is needed to always maintain a constant input dynamic range of the A/D converter.

The transmission section 20 has LPFs 21 (I, Q), LPFs 22 (I, Q), quadrature modulators 23 (G, D, P, W) (transmission modulation means), amplifiers 24 (G, D, P, W), LPFs 25 (G, D, P), and an isolator 26.

The LPFs 21 (I, Q) remove interference signals from the quadrature baseband signals I and Q of the GSM, DCS, and PCS and output the signals to the quadrature modulators 23 (G, D, P).

The LPF 21I removes an interference signal from the GSM's quadrature baseband signal I and outputs the signal to the quadrature modulator 23G. The LPF 21I removes an interference signal from the DCS's quadrature baseband signal I and outputs the signal to the quadrature modulator 23D. The LPF 21I removes an interference signal from the PCS's quadrature baseband signal I and outputs the signal to the quadrature modulator 23P.

The LPF 21Q removes an interference signal from the GSM's quadrature baseband signal Q and outputs the signal to the quadrature modulator 23G. The LPF 21Q removes an interference signal from the DCS's quadrature baseband signal Q and outputs the signal to the quadrature modulator 23D. The LPF 21Q removes an interference signal from the PCS's quadrature baseband signal Q and outputs the signal to the quadrature modulator 23P.

The LPFs 22 (I, Q) remove interference signals from the UMTS's quadrature baseband signals I and Q and output the signals to the quadrature modulator 23W. The LPF 22I removes an interference signal from the UMTS's quadrature baseband signal I and outputs the signal to the quadrature modulator 23W. The LPF 22Q removes an interference signal from the UMTS's quadrature baseband signal Q and outputs the signal to the quadrature modulator 23W.

Figure 3A:
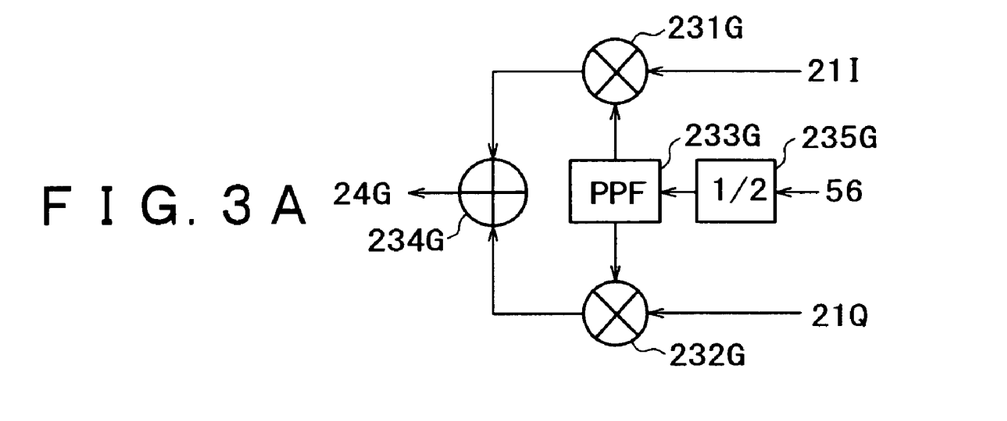
FIG. 3A shows a configuration of a quadrature modulator 23G.
Figure 3B:
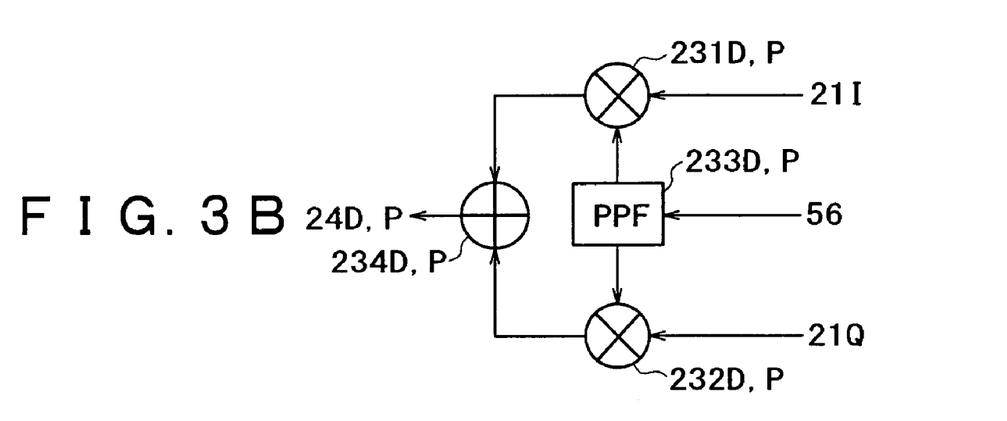
FIG. 3B shows a configuration of a quadrature modulator 23D or 23P.
Figure 3C:
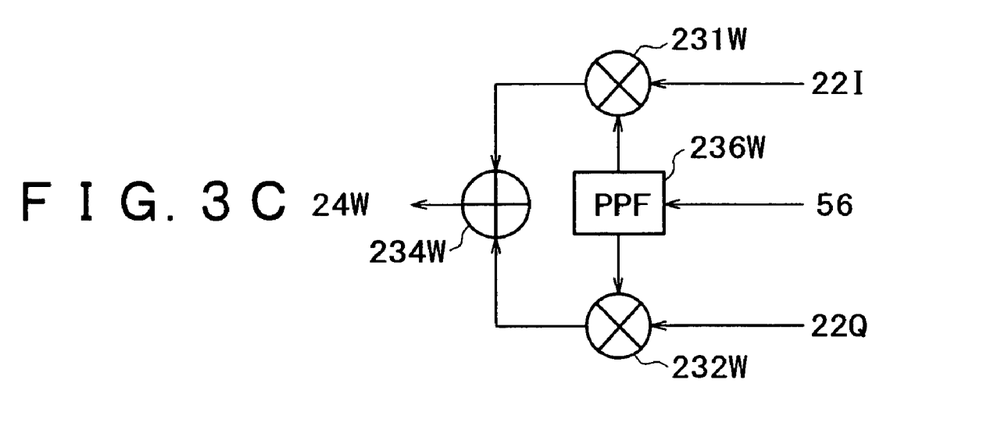
FIG. 3C shows a configuration of a quadrature modulator 23W.

The quadrature modulators 23 (G, D, P) quadrature-modulate outputs of the LPFs 21 (I, Q) based on a transmission modulation frequency output from a transmission image rejection mixer 56. The quadrature modulator 23W quadrature-modulates outputs of the LPFs 22 (I, Q) based on a transmission modulation frequency output from the transmission image rejection mixer 56. FIGS. 3A through 3C show configurations of the quadrature modulators 23 (G, D, P, W). FIG. 3A diagrams the quadrature modulator 23G. FIG. 3B diagrams the quadrature modulators 23D and 23P. FIG. 3C diagrams the quadrature modulator 23W.

An internal configuration of the quadrature modulator 23G will be described with reference to FIG. 3A. The quadrature modulator 23G includes a frequency mixer 231G, a frequency mixer 232G, a polyphase filter 233G, an adder 234G, and a ½ divider 235G.

The frequency mixer 231G mixes outputs of the LPF 21I and the polyphase filter 233G and outputs a result to the adder 234G. The frequency mixer 232G mixes outputs of the LPF 21Q and the polyphase filter 233G and outputs a result to the adder 234G. The polyphase filter 233G receives a divided output of the transmission image rejection mixer 56 and outputs a signal whose phases are orthogonal to each other. The adder 234G adds an output of the frequency mixer 231G and that of the frequency mixer 232G and outputs a result. The ½ divider 235G divides an output of the transmission image rejection mixer 56 and outputs a result to the transmission image rejection mixer 56. The LPFs 21I and 21Q and the polyphase filter 233G generate the same output frequency. This can provide the direct modulation (direct conversion) method.

An internal configuration of the quadrature modulator 23D will be described with reference to FIG. 3B. The quadrature modulator 23D includes a frequency mixer 231D, a frequency mixer 232D, a polyphase filter 233D, and an adder 234D.

The frequency mixer 231D mixes outputs of the LPF 21I and the polyphase filter 233D and outputs a result to the adder 234D. The frequency mixer 232D mixes outputs of the LPF 21Q and the polyphase filter 233D and outputs a result to the adder 234D. The polyphase filter 233D receives a divided output of the transmission image rejection mixer 56 and outputs a signal whose phases are orthogonal to each other. The adder 234D adds an output of the frequency mixer 231D and that of the frequency mixer 232D and outputs a result. The LPFs 21I and 21Q and the polyphase filter 233D generate the same output frequency. This can provide the direct modulation (direct conversion) method.

An internal configuration of the quadrature modulator 23P will be described with reference to FIG. 3B. The quadrature modulator 23P includes a frequency mixer 231P, a frequency mixer 232P, a polyphase filter 233P, and an adder 234P.

The frequency mixer 231P mixes outputs of the LPF 21I and the polyphase filter 233P and outputs a result to the adder 234P. The frequency mixer 232P mixes outputs of the LPF 21Q and the polyphase filter 233P and outputs a result to the adder 234P. The polyphase filter 233P receives a divided output of the transmission image rejection mixer 56 and outputs a signal whose phases are orthogonal to each other. The adder 234P adds an output of the frequency mixer 231P and that of the frequency mixer 232P and outputs a result. The LPFs 21I and 21Q and the polyphase filter 233P generate the same output frequency. This can provide the direct modulation (direct conversion) method.

An internal configuration of the quadrature modulator 23W will be described with reference to FIG. 3C. The quadrature modulator 23W includes a frequency mixer 231W, a frequency mixer 232W, an adder 234W, and a polyphase filter 236W.

The frequency mixer 231W mixes outputs of the LPF 21I and the polyphase filter 236W and outputs a result to the adder 234W. The frequency mixer 232W mixes outputs of the LPF 22Q and the polyphase filter 236W and outputs a result to the adder 234W. The polyphase filter 233W receives a divided output of the transmission image rejection mixer 56 and outputs a signal whose phases are orthogonal to each other. The adder 234W adds an output of the frequency mixer 231W and that of the frequency mixer 232W and outputs a result. The LPFs 22I and 22Q and the polyphase filter 233W generate the same output frequency. This can provide the direct modulation (direct conversion) method.

Figure 4:
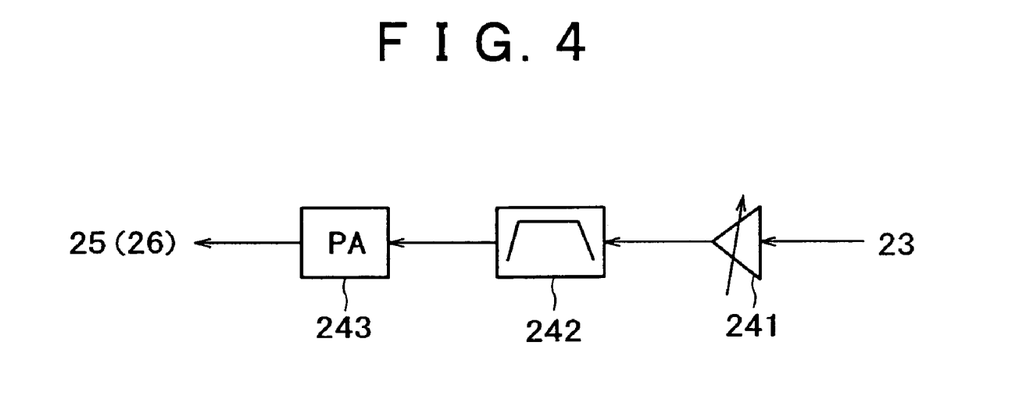
FIG. 4 shows an internal configuration of an amplifier 24 (G, D, P, W)

The amplifiers 24 (G, D, P, W) amplify or otherwise process outputs of the quadrature modulators 23 (G, D, P, W). FIG. 4 shows an internal configuration of the amplifiers 24 (G, D, P, W).

The amplifiers 24 (G, D, P, W) include variable gain high frequency amplifiers 241 (G, D, P, W), band pass filters 242 (G, D, P, W), and power amplifiers 243 (G, D, P, W). The variable gain high frequency amplifiers 241 (G, D, P, W) amplify outputs of the quadrature modulators 23 (G, D, P, W). However, the gain is controllable and can correspond to a high frequency signal input. The band pass filters 242 (G, D, P, W) remove an interference signal such as an adjacent channel from outputs of the variable gain high frequency amplifiers 241 (G, D, P, W) and outputs a result. The power amplifiers 243 (G, D, P, W) amplify outputs of the band pass filters 242 (G, D, P, W).

The LPFs 25 (G, D, P) remove interference signals from output signals of the amplifiers 24 (G, D, P) and output the signals to the high-frequency switch 64. The isolator 26 outputs a signal from the amplifier 24W to the duplexer 62.

The VC-TCXO 51 supplies a reference signal for PLL control to the fixed local oscillator block 52, the reception local oscillator block 53, and the transmission local oscillator block 54. For example, the VC-TCXO 51 generates the reference signal at a frequency of 19.2 MHz.

Figure 5:
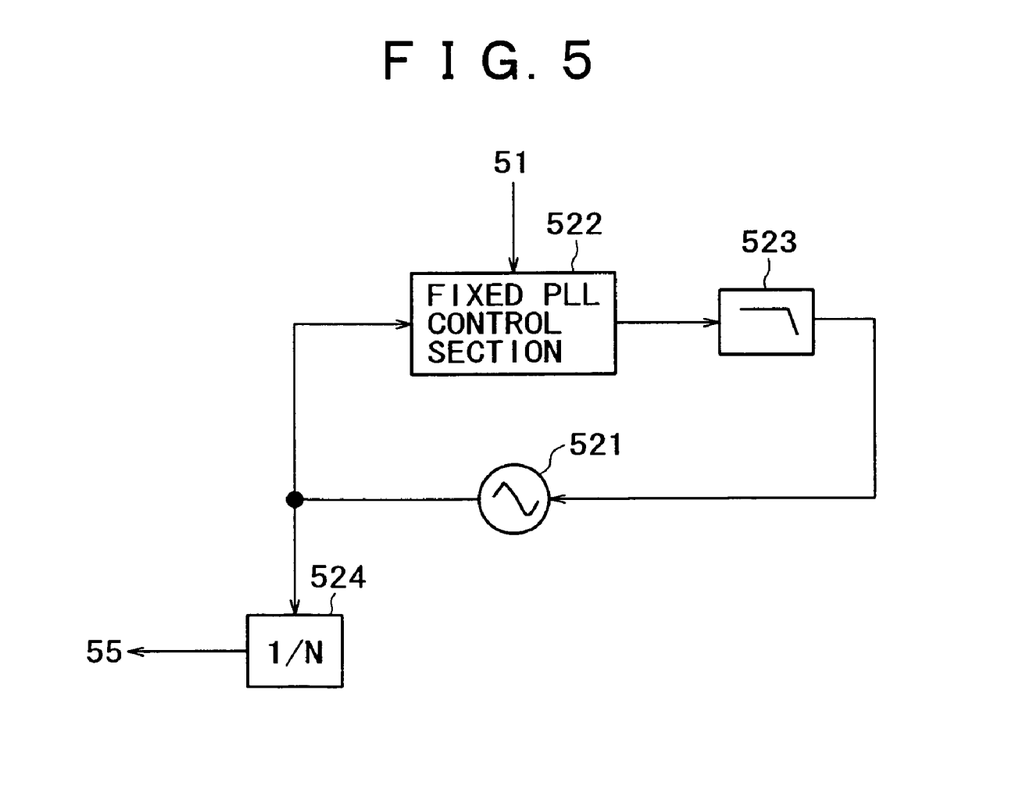
FIG. 5 shows an internal configuration of a fixed local oscillator block 52.

An internal configuration of the fixed local oscillator block 52 will now be described with reference to FIG. 5. The fixed local oscillator block 52 includes a local oscillator 521, a fixed PLL control section 522, an LPF 523, and a variable ½ divider 524.

The local oscillator 521 inside the fixed local oscillator block 52 generates a fixed-frequency signal. For example, the frequency is fixed to 3,040 MHz. The fixed PLL control section 522 compares, in terms of phases, an output signal of the local oscillator 521 with the PLL control reference signal output from the VC-TCXO 51 and outputs a phase comparison difference. The LPF 523 passes low pass components of the phase comparison difference and supplies a result to the local oscillator 521.

Further, the internal configuration of the fixed local oscillator block 52 including a local oscillator 521, a fixed PLL control section 522, an LPF 523, and a variable ½ divider 524 is as follows. The local oscillator 521 outputs a signal in phase synchronization with the PLL control reference signal output from the VC-TCXO 51. The variable ½ divider 524 divides and outputs an output of the local oscillator 521. The dividing ratio can be changed in accordance with signal types. For example, the frequency is changed to one fourth when GSM and DCS signals are received, or to one eighth when a PCS signal is received. An output of the variable ½ divider 524 becomes an output of the fixed local oscillator block 52.

Figure 6:
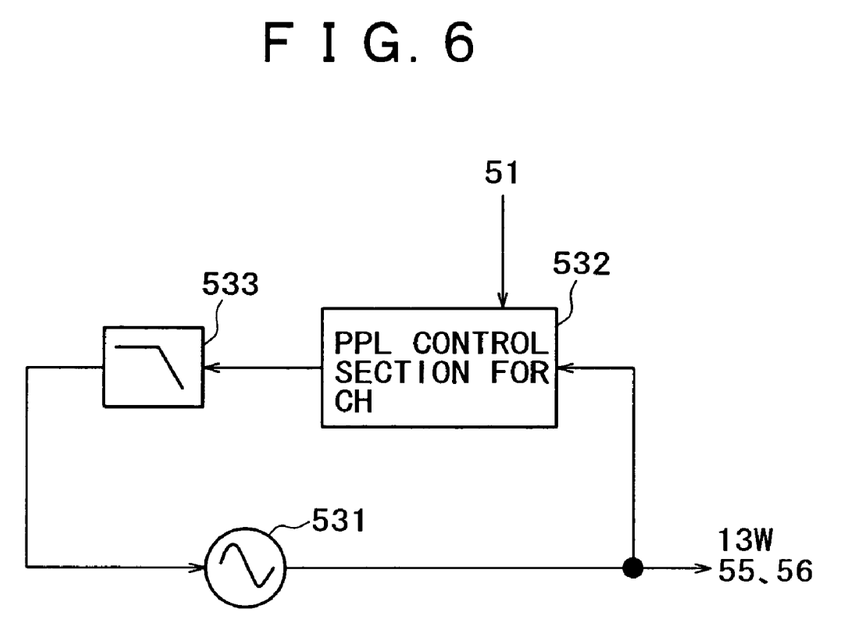
FIG. 6 shows an internal configuration of a reception local oscillator block 53.

An internal configuration of the reception local oscillator block 53 will now be described with reference to FIG. 6. The reception local oscillator block 53 includes a local oscillator 531, a PLL control section for channel control 532, and an LPF 533.

The local oscillator 531 inside the reception local oscillator block 53 can change frequencies of signals to be generated. For example, frequencies can be changed within a range of 3,930 to 4,340 MHz. In more detail, it may be preferable to change frequencies in the range 4,080 to 4,220 MHz when receiving a GSM signal; in the range 3,990 to 4,140 MHz when receiving a DCS signal; in the range 4,050 to 4,170 MHz when receiving a PCS signal; and in the range 4,220 to 4,340 MHz when receiving a UMTS signal. The PLL control section for channel control 532 compares, in terms of phases, an output signal of the local oscillator 531 with the PLL control reference signal output from the VC-TCXO 51 and outputs a phase comparison difference. The LPF 533 passes low pass components of the phase comparison difference and supplies a result to the local oscillator 531.

Further the internal configuration of the reception local oscillator block 53 including a local oscillator 531, a PLL control section for channel control 532, and an LPF 533 is as follows. The local oscillator 531 outputs a signal in phase synchronization with the PLL control reference signal output from the VC-TCXO 51. An output of the local oscillator 531 becomes an output (first signal) of the reception local oscillator block 53.

Figure 7:
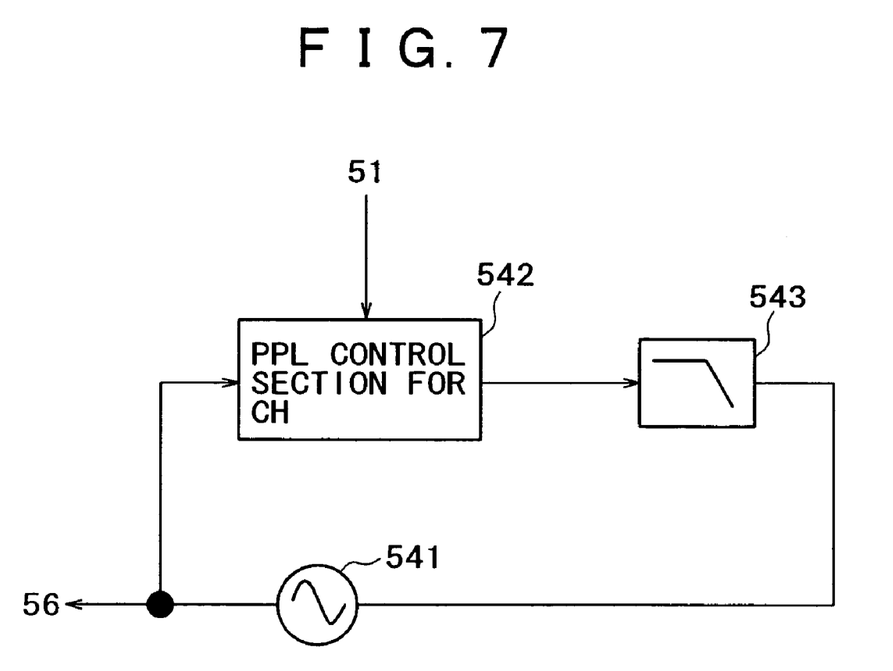
FIG. 7 shows an internal configuration of a transmission local oscillator block 54.

An internal configuration of the transmission local oscillator block 54 will now be described with reference to FIG. 7. The transmission local oscillator block 54 includes a local oscillator 541, a PLL control section for channel control 542, and an LPF 543.

The local oscillator 541 inside the transmission local oscillator block 54 can change frequencies of signals to be generated. For example, frequencies can be changed within a range of 4,400 to 4,780 MHz. In more detail, it may be preferable to change frequencies in the range 4,640 to 4,780 MHz when receiving a GSM signal; in the range 4,560 to 4,710 MHz when receiving a DCS signal; in the range 4,400 to 4,520 MHz when receiving a PCS signal; and in the range 4,600 to 4,720 MHz when receiving a UMTS signal. The PLL control section for channel control 542 compares, in terms of phases, an output signal of the local oscillator 541 with the PLL control reference signal output from the VC-TCXO 51 and outputs a phase comparison difference. The LPF 543 passes low pass components of the phase comparison difference and supplies a result to the local oscillator 541.

The internal configuration of the transmission local oscillator block 54 including a local oscillator 541, a PLL control section for channel control 542, and an LPF 543 is as follows. The local oscillator 541 outputs a signal in phase synchronization with the PLL control reference signal output from the VC-TCXO 51. An output of the local oscillator 541 becomes an output (second signal) of the transmission local oscillator block 54.

Figure 8:
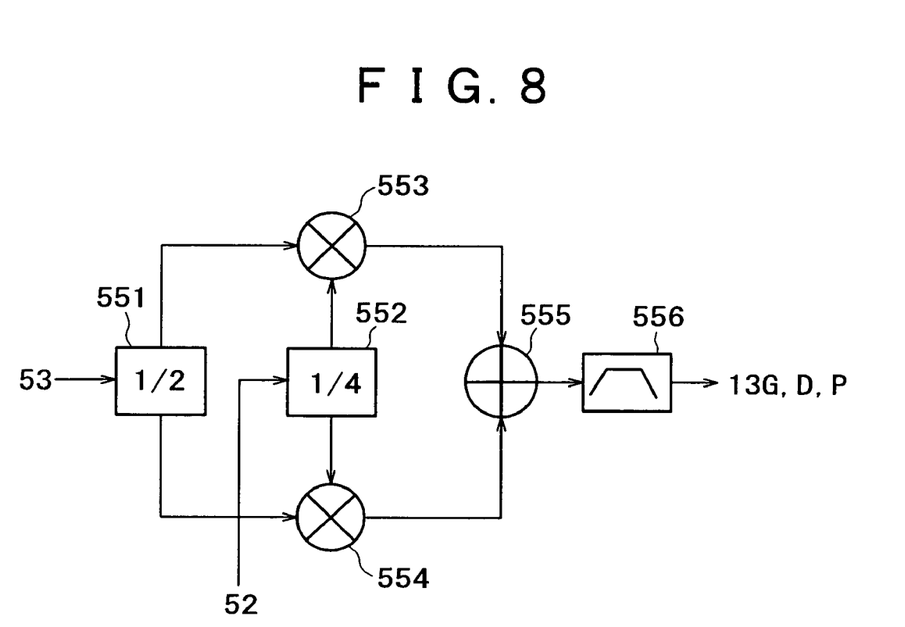
FIG. 8 shows an internal configuration of a reception image rejection mixer 55.

An internal configuration of the reception image rejection mixer 55 will now be described with reference to FIG. 8. The reception image rejection mixer 55 includes a ½ divider 551, a ¼ divider 552, frequency mixers 553 and 554, an adder 555, and a band pass filter 556.

The ½ divider 551 halves an output of the reception local oscillator block 53 and supplies a result to each of the frequency mixers 553 and 554. The ¼ divider 552 quarters an output of the fixed local oscillator block 52 and supplies a result to each of the frequency mixers 553 and 554. The ¼ divider 552 outputs signals whose phases are orthogonal to each other. The frequency mixers 553 and 554 mix outputs of the ½ divider 551 and the ¼ divider 552 and supply outputs to the adder 555. The adder 555 adds the outputs of the frequency mixers 553 and 554 and produces an output. A BPF 556 passes only a specified band in the output of the adder 555. The output of the BPF 556 becomes an output of the reception image rejection mixer 55. The frequency of this output becomes a modulated frequency for reception.

Figure 9:
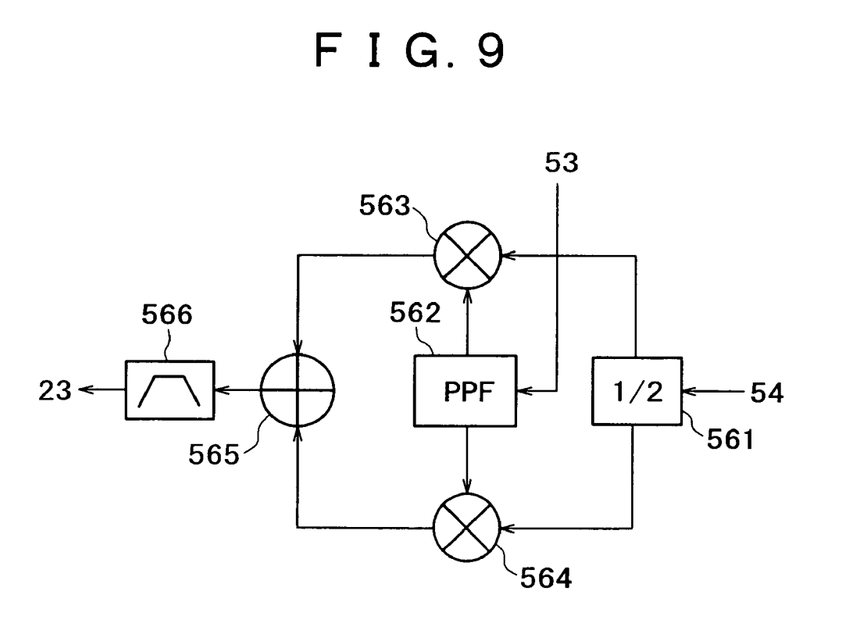
FIG. 9 shows an internal configuration of a transmission image rejection mixer 56.

An internal configuration of the transmission image rejection mixer 56 will now be described with reference to FIG. 9. The transmission image rejection mixer 56 includes a ½ divider 561, a polyphase filter 562, frequency mixers 563 and 564, an adder 565, and a band pass filter 566.

The ½ divider 561 halves the output (second signal) of the transmission local oscillator block 54 and supplies a result to each of the frequency mixers 563 and 564. The polyphase filter 562 supplies the frequency mixers 563 and 564 with the output (first signal) of the reception local oscillator block 53 as two signals orthogonal to each other. The frequency mixers 563 and 564 mix outputs of the divider 561 and the polyphase filter 562 and supplies outputs to the adder 565. The adder 565 adds the outputs of the frequency mixers 563 and 564 and produces an output. A BPF 566 passes only a specified band in the output of the adder 565. The output of the BPF 566 becomes an output of the transmission image rejection mixer 56. The frequency of this output becomes a transmission modulation frequency.

Operations of the first embodiment will now be described.

First, a reception operation will be described. When the triple-band antenna 74 receives GSM, DCS, and PCS signals, the high-frequency switch 64 sends the received signals to the band pass filters 11 (G, D, P) in accordance with the signal types. The signals sent to the BPFs 11 (G, D, P) are then sent to the quadrature demodulators 13 (G, D, P) via the variable gain low noise amplifiers 12 (G, D, P). The quadrature demodulators 13 (G, D, P) demodulate the input signals which are then converted into quadrature baseband signals I and Q via the variable gain amplifiers 14 (I, Q) and the LPFs 15 (I, Q).

When the UMTS antenna 72 receives a UMTS (WCDMA) signal, the duplexer 62 sends the received signal to the quadrature demodulator 13W via the variable gain low noise amplifier 12W. The quadrature demodulator 13W demodulates the input signal. The modulated signal is converted into the quadrature baseband signals I and Q via the LPFs 16 (I, Q) and the variable gain amplifiers 17 (I, Q). The DC amplifiers 18 (I, Q) supply a DC feedback to remove a DC offset.

During demodulation by the quadrature demodulators 13 (G, D, P, W), there must be correspondence between various signal bands (925 to 960 MHz for GSM; 1,805 to 1,880 MHz for DCS; 1,930 to 1,990 MHz for PCS; and 2,110 to 2,170 MHz for UMTS) and signal frequency bands supplied to the frequency mixers 131 and 132 (G, D, P, W) based on the signal output from the reception image rejection mixer 55. Since the fixed local oscillator block 52 and the reception local oscillator block 53 are configured as mentioned above, the frequency bands correspond to each other. This will be proved for each signal type.

When a GSM signal is received, the local oscillator 521 oscillates a frequency of 3,040 MHz; the variable ½ divider 524 provides a dividing ratio of ¼; and the local oscillator 531 oscillates frequencies ranging from 4,080 to 4,220 MHz. The ½ divider 551 supplies the frequency mixers 553 and 554 with signal frequencies ranging from 2,040 MHz (4,080×(½)) to 2,110 MHz (4,220×(½)). The ¼ divider 552 supplies the frequency mixers 553 and 554 with a signal frequency of 190 MHz (3,040×(¼)×(¼)). Therefore, the reception image rejection mixer 55 outputs signal frequencies ranging from 1,850 MHz (2,040−190) to 1,920 MHz (2,110−190). A signal output from the reception image rejection mixer 55 is halved by the ½ divider 133G and is supplied to the frequency mixers 131G and 132G. The signal frequencies range from 925 MHz (1,850/2) to 960 MHz (1,920/2).

When a DCS signal is received, the local oscillator 521 oscillates a frequency of 3,040 MHz; the variable ½ divider 524 provides a dividing ratio of ¼; and the local oscillator 531 oscillates frequencies ranging from 3,990 to 4,140 MHz. The ½ divider 551 supplies the frequency mixers 553 and 554 with signal frequencies ranging from 1,995 MHz (3,990×(½)) to 2,070 MHz (4,140×(½)). The ¼ divider 552 supplies the frequency mixers 553 and 554 with a signal frequency of 190 MHz (3,040×(¼)×(¼)). Therefore, the reception image rejection mixer 55 outputs signal frequencies ranging from 1,850 MHz (1,995−190) to 1,880 MHz (2,070−190). A signal output from the reception image rejection mixer 55 is supplied to the frequency mixers 131D and 132D via the polyphase filter 134D. The signal frequencies range from 1,805 to 1,880 MHz.

When a PCS signal is received, the local oscillator 521 oscillates a frequency of 3,040 MHz; the variable ½ divider 524 provides a dividing ratio of ⅛; and the local oscillator 531 oscillates frequencies ranging from 4,050 to 4,170 MHz. The ½ divider 551 supplies the frequency mixers 553 and 554 with signal frequencies ranging from 2,025 MHz (4,050×(½)) to 2,085 MHz (4,170×(½)). The ¼ divider 552 supplies the frequency mixers 553 and 554 with a signal frequency of 95 MHz (3,040×(⅛)×(¼)). Therefore, the reception image rejection mixer 55 outputs signal frequencies ranging from 1,930 MHz (2,025−190) to 1,990 MHz (2,085−190). A signal output from the reception image rejection mixer 55 is supplied to the frequency mixers 131P and 132P via the polyphase filter 134P. The signal frequencies range from 1,930 to 1,990 MHz.

When a UMTS signal is received, the local oscillator 521 oscillates frequencies ranging from 4,220 to 4,340 MHz. Therefore, the reception image rejection mixer 55 outputs signal frequencies ranging from 4,220 to 4,340 MHz. A signal output from the reception image rejection mixer 55 is supplied to the frequency mixers 131W and 132W via the polyphase filter 133W. The signal frequencies range from 2,110 (4,220/2) to 2,170 MHz (4,340/2).

The following describes a transmission operation. The quadrature modulators 23 (G, D, P) quadrature-modulate baseband signals I and Q for GSM, DCS, and PCS via the LPFs 21 (I, Q). Outputs of the quadrature modulators 23 (G, D, P) are supplied to the high-frequency switch 64 via the amplifiers 24 (G, D, P) and the LPFs 25 (G, D, P). An output of the high-frequency switch 64 is transmitted from the triple-band antenna 74.

The quadrature modulator 23W quadrature-modulates baseband signals I and Q for UMTS via the LPFs 22 (I, Q). An output of the quadrature modulator 23W is sent to the duplexer 62 via the amplifier 24W and the isolator 26. An output of the duplexer 62 is transmitted from the UMTS antenna 72.

During demodulation by the quadrature modulators 23 (G, D, P, W), there must be correspondence between various signal bands (880 to 915 MHz for GSM; 1,710 to 1,785 MHz for DCS; 1,850 to 1,910 MHz for PCS; and 1,920 to 1,980 MHz for UMTS) and signal frequency bands supplied to the frequency mixers 231 and 232 (G, D, P, W) based on the signal output from the reception image rejection mixer 56. Since the reception local oscillator block 53 and the transmission local oscillator block 54 are configured as mentioned above, the frequency bands correspond to each other. This will be proved for each signal type.

When a GSM signal is transmitted, the local oscillator 531 oscillates frequencies ranging from 4,080 to 4,220 MHz; and the local oscillator 541 oscillates frequencies ranging from 4,640 to 4,780 MHz. The ½ divider 561 supplies the frequency mixers 563 and 564 with signal frequencies ranging from 2,320 MHz (4,640×(½)) to 2,390 MHz (4,780×(½)). The polyphase filter 562 supplies the frequency mixers 563 and 564 with signal frequencies ranging from 4,080 to 4,220 MHz. Therefore, the transmission image rejection mixer 56 outputs signal frequencies ranging from 1,760 MHz (4,080−2,320) to 1,830 MHz (4,220−2,390). A signal output from the transmission image rejection mixer 56 is halved by the ½ divider 235G and is supplied to the frequency mixers 231G and 232G. The signal frequencies range from 880 MHz (1,760/2) to 915 MHz (1,830/2).

When a DCS signal is transmitted, the local oscillator 531 oscillates frequencies ranging from 3,990 to 4,140 MHz; and the local oscillator 541 oscillates frequencies ranging from 4,560 to 4,710 MHz. The ½ divider 561 supplies the frequency mixers 563 and 564 with signal frequencies ranging from 2,280 MHz (4,560×(½)) to 2,355 MHz (4,710×(½)). The polyphase filter 562 supplies the frequency mixers 563 and 564 with signal frequencies ranging from 3,990 to 4,140 MHz. Therefore, the transmission image rejection mixer 56 outputs signal frequencies ranging from 1,710 MHz (3,990−2,280) to 1,785 MHz (4,140−2,355). A signal output from the transmission image rejection mixer 56 is supplied to the frequency mixers 231D and 232D via the polyphase filter 233D. The signal frequencies range from 1,710 to 1,785 MHz.

When a PCS signal is transmitted, the local oscillator 531 oscillates frequencies ranging from 4,050 to 4,170 MHz; and the local oscillator 541 oscillates frequencies ranging from 4,400 to 4,520 MHz. The ½ divider 561 supplies the frequency mixers 563 and 564 with signal frequencies ranging from 2,200 MHz (4,400×(½)) to 2,260 MHz (4,520×(½)). The polyphase filter 562 supplies the frequency mixers 563 and 564 with signal frequencies ranging from 4,050 to 4,170 MHz. Therefore, the transmission image rejection mixer 56 outputs signal frequencies ranging from 1,850 MHz (4,050−2,200) to 1,910 MHz (4,170−2,260). A signal output from the transmission image rejection mixer 56 is supplied to the frequency mixers 231P and 232P via the polyphase filter 233P. The signal frequencies range from 1,850 to 1,910 MHz.

When a UMTS signal is transmitted, the local oscillator 531 oscillates frequencies ranging from 4,220 to 4,340 MHz; and the local oscillator 541 oscillates frequencies ranging from 4,600 to 4,720 MHz. The ½ divider 561 supplies the frequency mixers 563 and 564 with signal frequencies ranging from 2,300 MHz (4,600×(½)) to 2,360 MHz (4,720×(½)). The polyphase filter 562 supplies the frequency mixers 563 and 564 with signal frequencies ranging from 4,220 to 4,340 MHz. Therefore, the transmission image rejection mixer 56 outputs signal frequencies ranging from 1,920 MHz (4,220–2,300) to 1,980 MHz (4,340–2,360). A signal output from the transmission image rejection mixer 56 is supplied to the frequency mixers 231G and 232G via the polyphase filter 236D. The signal frequencies range from 1,920 to 1,980 MHz.

According to the first embodiment, the common transmission image rejection mixer 56 supplies transmission modulation frequencies to a plurality of quadrature modulators 23 (G, D, P, W). Consequently, this eliminates the need for providing the transmission image rejection mixer 56 to respective transmission signal types, preventing the circuit scale from increasing.

Since the transmission image rejection mixer 56 supplies modulation frequencies, frequencies generated from the transmission local oscillator block 54 and the reception local oscillator block 53 need not correspond to those specified for the transmission signal types. Accordingly, it is possible to narrow a range of changing frequencies generated from the transmission local oscillator block 54 and the reception local oscillator block 53, preventing the circuit scale of these oscillators from increasing. For example, the transmission local oscillator block 54 may use the single local oscillator 541. The transmission local oscillator 53 may use the single local oscillator 531. The use of VCOs can easily implement the local oscillators 531 and 541.

Moreover, the common reception image rejection mixer 55 supplies reception demodulation frequencies to a plurality of quadrature demodulators 13. In addition, the reception image rejection mixer 55 uses the reception local oscillator block 53 the transmission image rejection mixer 56 uses. Since the transmission image rejection mixer 56 and the reception image rejection mixer 55 share the reception local oscillator block 53, it is unnecessary to prepare the reception local oscillator block 53 for transmission and reception, preventing the circuit scale from increasing.

Second Embodiment

The second embodiment differs from the first embodiment in the system configuration used for transmission of GSM, DCS, and PCS signals.

Figure 10:
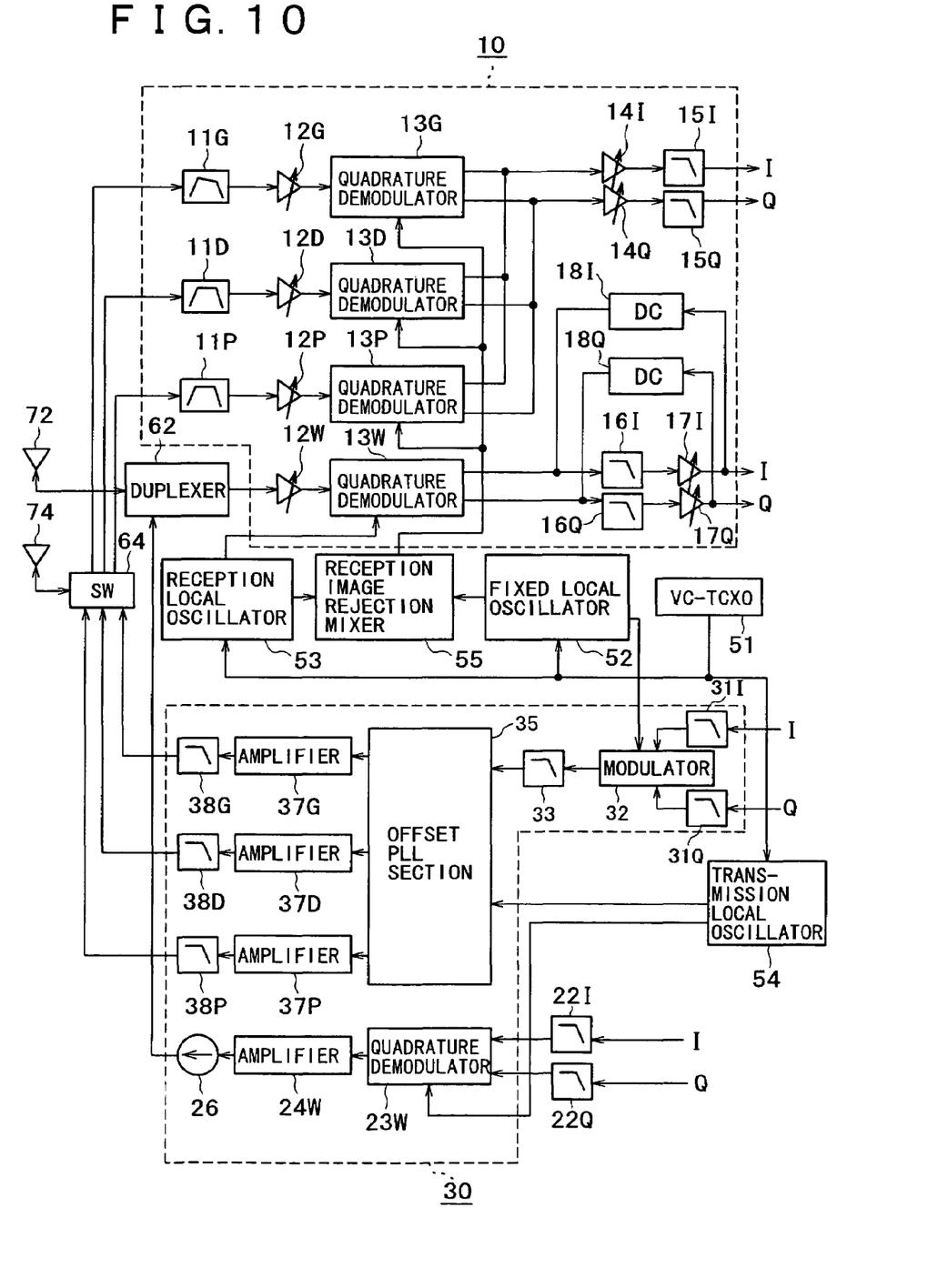
FIG. 10 is a block diagram showing a configuration of the transmission/reception apparatus 1 according to a second embodiment of the present invention.

FIG. 10 is a block diagram showing a configuration of the transmission/reception apparatus 1 according to the second embodiment of the present invention. The transmission/reception apparatus 1 according to the second embodiment comprises a reception section 10, a transmission section 30, a VC-TCXO 51, a fixed local oscillator block 52, a reception local oscillator (fourth local oscillation means) 53, a transmission local oscillator (third local oscillation means) 54, a reception image rejection mixer (reception demodulation frequency output means) 55, a duplexer 62, a high-frequency switch 64, a UMTS antenna 72, and a triple-band antenna 74. Hereinafter, the mutually corresponding parts in the first and second embodiments are designated by the same reference numerals and a detailed description is omitted for simplicity.

The reception section 10, the VC-TCXO 51, the fixed local oscillator block 52, the reception local oscillator (fourth local oscillation means) 53, the reception image rejection mixer (reception demodulation frequency output means) 55, the duplexer 62, the high-frequency switch 64, the UMTS antenna 72, and the triple-band antenna 74 are the same as those for the first embodiment. It should be noted that an output of the reception local oscillator (fourth local oscillation means) 53 is referred to as a fourth signal.

The transmission section 30 includes LPFs 31 (I, Q), a modulator (transmission modulation means) 32, an LPF 33, an offset PLL section (transmission signal output means) 35, amplifiers 37 (G, D, P), LPFs 38 (G, D, P), LPFs 22 (I, Q), a quadrature modulator 23W, a amplifier 24W, and an isolator 26.

The LPFs 22 (I, Q), the quadrature modulator 23W, the amplifier 24W, and the isolator 26 are the same as those for the first embodiment.

The LPFs 31 (I, Q) remove interference signals from the quadrature baseband signals I and Q for GSM, DCS, and PCS and supply the signals to the modulator 32.

Figure 11:
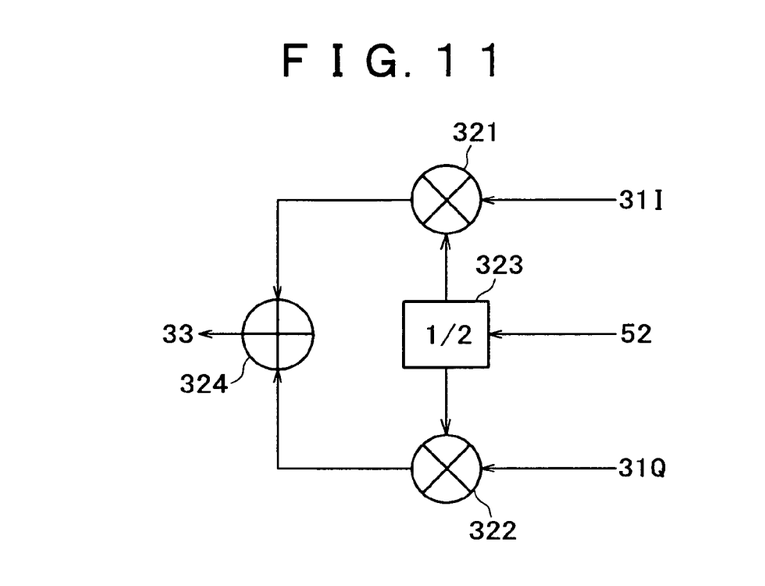
FIG. 11 shows an internal configuration of a modulator 32.

An internal configuration of the modulator 32 will now be described with reference to FIG. 11. The modulator 32 modulates a transmission signal based on the frequency output from the fixed local oscillator block 52. The modulator 32 includes frequency mixers 321 and 322, a ½ divider 323, and an adder 324. The frequency mixers 321 and 322 mix outputs of the LPFs 31 (I, Q) and of the ½ divider 323. The ½ divider 323 halves an output of the fixed local oscillator block 52 and supplies a result to each of the frequency mixers 321 and 322. The frequency mixers 321 and 322 are supplied with outputs whose phases are orthogonal to each other. The adder 324 adds outputs of the frequency mixers 321 and 322 and generates an output. The output of the adder 324 is equivalent to that of the modulator 32.

The LPF 33 supplies the offset PLL section 35 with low pass components in an output of the adder 324.

Figure 12:
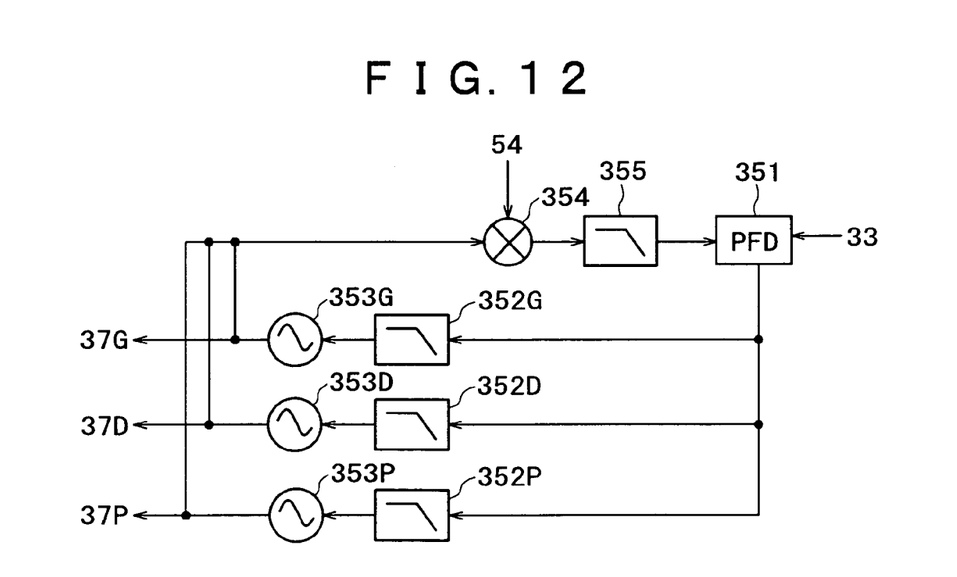
FIG. 12 shows an internal configuration of an offset PLL section 35.

An internal configuration of the offset PLL section 35 will now be described with reference to FIG. 12. The offset PLL section 35 includes a PFD 351, low pass filters 352 (G, D, P), local oscillators 353 (G, D, P), a frequency mixer 354, and a low pass filter 355.

The PFD 351 compares an output of the low pass filter 355 with an output, phase, and frequency of the LPF 33 and outputs a comparison result to the low pass filters 352 (G, D, P) according to the signal types. This provides control to supply the PFD 351 with equal output frequencies from the low pass filter 355 and the LPF 33. The low pass filters 352 (G, D, P) pass low pass components in an output of the PFD 351. In accordance with outputs from the low pass filters 352 (G, D, P), the local oscillators 353 (G, D, P) change frequencies of the output signals. The frequency mixer 354 mixes outputs of the local oscillators 353 (G, D, P) with an output of the variable ½ divider 544 in the transmission local oscillator block 54 and supplies an output. The low pass filter 355 passes low pass components in the output from the frequency mixer 354. The outputs of the local oscillator 353 (G, D, P) are equivalent to those of the offset PLL section 35.

Figure 13:
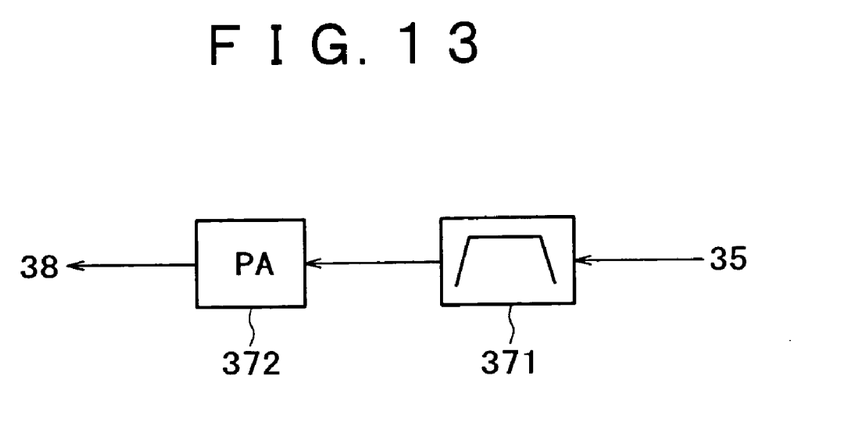
FIG. 13 shows an internal configuration of an amplifier 37 (G, D, P)

An internal configuration of the amplifier 37 (G, D, P) will now be described with reference to FIG. 13. The amplifier 37 (G, D, P) includes a band pass filter 371 (G, D, P) and a power amplifier 372 (G, D, P). The band pass filter 371 (G, D, P) removes an interference signal bypassing components within a specified band of an output from the offset PLL section 35. The power amplifier 372 (G, D, P) amplifies and generates an output from the band pass filter 371 (G, D, P). The output of the band pass filter 371 (G, D, P) is equivalent to that of the amplifier 37 (G, D, P).

The LPF 38 (G, D, P) supplies the high-frequency switch 64 with low pass components in an output from the amplifier 37 (G, D, P).

Figure 14:
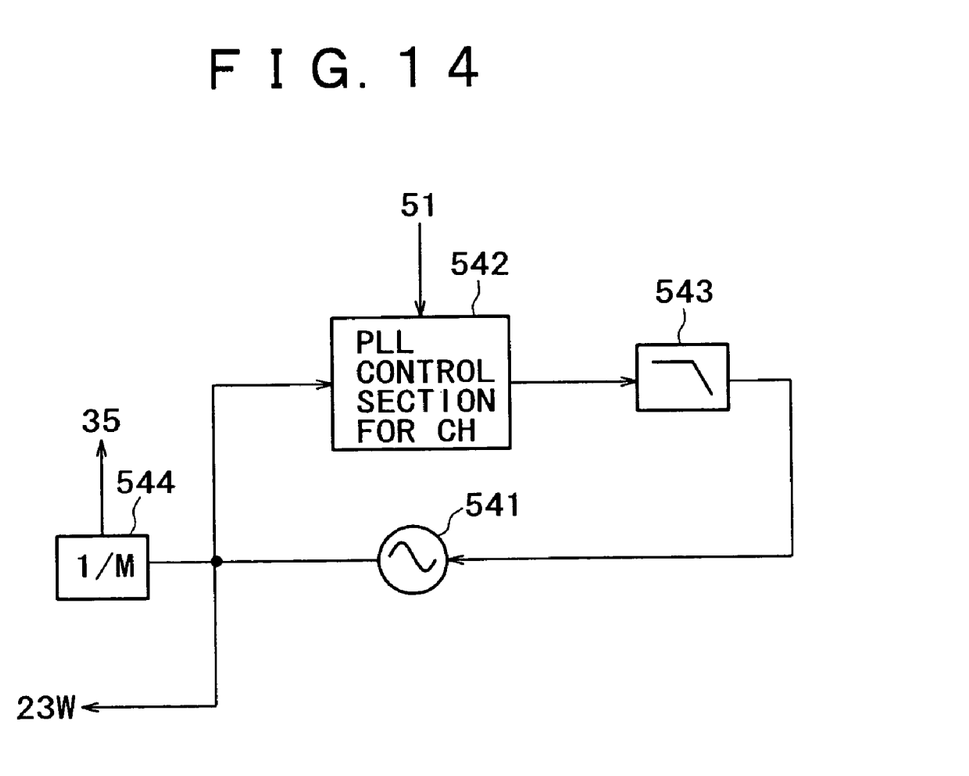
FIG. 14 shows an internal configuration of a transmission local oscillator block 54.

An internal configuration of the transmission local oscillator block 54 will now be described with reference to FIG. 14. The transmission local oscillator block 54 includes a local oscillator 541, a PLL control section for channel control 542, an LPF 543, and a variable ½ divider 544.

The local oscillator 541 can change frequencies of signals to be generated. For example, frequencies can be changed within a range of 3,840 to 4,340 MHz. In more detail, it may be preferable to change frequencies in the range 4,000 to 4,280 MHz when transmitting a GSM signal; in the range 4,180 to 4,330 MHz when transmitting a DCS signal; in the range 4,080 to 4,200 MHz when transmitting a PCS signal; and in the range 3,840 to 3,960 MHz when transmitting a UMTS signal. Like the first embodiment, an output of the local oscillator 541 is supplied to the quadrature modulator 23W. The PLL control section for channel control 542 compares, in terms of phases, a signal output from the local oscillator 541 with the PLL control reference signal output from the VC-TCXO 51 and generates a phase comparison difference. The LPF 543 passes low pass components of the phase comparison difference and supplies a result to the local oscillator 541.

Further, the internal configuration of the transmission local oscillator block 54 including a local oscillator 541, a PLL control section for channel control 542, an LPF 543, and a variable ½ divider 544 is as follows. The local oscillator 541 outputs a signal in phase synchronization with the PLL control reference signal output from the VC-TCXO 51. The variable ½ divider 544 divides a frequency of the signal output from the local oscillator 541 and outputs a result to the frequency mixer 354. The dividing ratio can be changed in accordance with the signal types. For example, the signal is output to the frequency mixer 354 by dividing the frequency by 8 during GSM signal transmission or by 2 during DCS or PCS signal transmission. An output from the variable ½ divider 544 is referred to as a third signal.

The following describes operations according to the second embodiment.

Operations for receiving GSM, DCS, PCS, and UMTS signals and transmitting UMTS signals are the same as those for the first embodiment. The following describes operations for transmitting GSM, DCS, and PCS signals.

The modulator 32 quadrature-modulates baseband signals I and Q for GSM, DCS, and PCS via the LPF 31 (I, Q). An output of the modulator 32 is sent to the offset PLL section 35 via the LPF 33. An output from the offset PLL section 35 is sent to the high-frequency switch 64 via the amplifier 37 (G, D, P) and the LPF 38 (G, D, P). An output from the high-frequency switch 64 is transmitted from the high-frequency switch 64.

There must be correspondence between various signal bands (880 to 915 MHz for GSM; 1,710 to 1,785 MHz for DCS; and 1,850 to 1,910 MHz for PCS) and signal frequency bands of the local oscillator 353 (G, D, P) in the offset PLL section 35. According to the second embodiment, these bands correspond to each other. This will be proved for each signal type.

When a GSM signal is transmitted, the local oscillator 521 oscillates a frequency of 3,040 MHz; the variable ½ divider 524 provides a dividing ratio of ¼; the local oscillator 541 oscillates frequencies ranging from 4,000 to 4,280 MHz; and the variable ½ divider 544 provides a dividing ratio of ⅛. When the modulator 32 supplies the PFD 351 with a signal via the LPF 33, the signal's frequency is the same as that output from the ½ divider 323, i.e., 380 MHz (3,040×(¼)×(½)). When the frequency mixer 354 supplies a signal to the PFD 351 via the low pass filter 355, the signal's frequency is the sum of the frequency of a signal supplied to the frequency mixer 354 from the transmission local oscillator block 54 and the frequency oscillated from the local oscillator 353G in FIG. 12. The transmission local oscillator block 54 supplies the frequency mixer 354 with a signal having frequencies ranging from 500 (4,000×(⅛)) to 535 MHz (4,280×(⅛)). Therefore, the local oscillator 353G oscillates frequencies ranging from 880 (500+380) to 915 MHz (535+380).

When a DCS signal is transmitted, the local oscillator 521 oscillates a frequency of 3,040 MHz; the variable ½ divider 524 provides a dividing ratio of ¼; the local oscillator 541 oscillates frequencies ranging from 4,180 to 4,330 MHz; and the variable ½ divider 544 provides a dividing ratio of ½. When the modulator 32 supplies the PFD 351 with a signal via the low pass filter 355, the signals frequency is the same as that output from the ½ divider 323, i.e., 380 MHz (3,040×(¼)×(½)). When the frequency mixer 354 supplies a signal to the PFD 351 via the low pass filter 355, the signals frequency is a difference between the frequency of a signal supplied to the frequency mixer 354 from the transmission local oscillator block 54 and the frequency oscillated from the local oscillator 353D in FIG. 12. The transmission local oscillator block 54 supplies the frequency mixer 354 with a signal having frequencies ranging from 2,090(4,180×(½)) to 2,165 MHz (4,330×(½)). Therefore, the local oscillator 353D oscillates frequencies ranging from 1,710(2,090−380) to 1,785 MHz (2,165−380).

When a PCS signal is transmitted, the local oscillator 521 oscillates a frequency of 3,040 MHz; the variable ½ divider 524 provides a dividing ratio of ⅛; the local oscillator 541 oscillates frequencies ranging from 4,080 to 4,220 MHz; and the variable ½ divider 544 provides a dividing ratio of ½. When the modulator 32 supplies the PFD 351 with a signal via the LPF 33, the signal's frequency is the same as that output from the ½ divider 323, i.e., 190 MHz (3,040×(⅛)×(½)). When the frequency mixer 354 supplies a signal to the PFD 351 via the low pass filter 355, the signal's frequency is a difference between the frequency of a signal supplied to frequency mixer 354 from the transmission local oscillator block 54 and the frequency oscillated from the local oscillator 353P in FIG. 12. The transmission local oscillator block 54 supplies the frequency mixer 354 with a signal having frequencies ranging from 2,040(4,080×(½)) to 2,100 MHz (4,200×(½)). Therefore, the local oscillator 353P oscillates frequencies ranging from 1,850(2,040−190) to 1,910 MHz (2,100−190).

The second embodiment eliminates the need for providing the offset PLL section 35 to respective transmission signal types, preventing the circuit scale from increasing.

Further, the offset PLL section 35 adjusts a transmission signal frequency to the frequency specified for each transmission signal type. Therefore, frequencies output from the transmission local oscillator block 54 and the modulator 32 need not correspond to those specified for the transmission signal types. As a result, it is possible to narrow a range of changing frequencies generated from the transmission local oscillator block 54, preventing the circuit scale of this oscillator from increasing. For example, the transmission local oscillator block 54 may use the single local oscillator 541. The use of VCOs can easily implement the local oscillator 541.

Moreover, the common reception image rejection mixer 55 supplies reception demodulation frequencies to a plurality of quadrature demodulators 13. In addition, the reception image rejection mixer 55 uses the fixed local oscillator block 52 the modulator 32 uses. Since the modulator 32 and reception image rejection mixer 55 share the fixed local oscillator block 52, it is unnecessary to prepare the fixed local oscillator block 52 independently, preventing the circuit scale from increasing.

The invention claimed is:

1. A communication apparatus comprising:
    a fixed local oscillation means for generating a fixed frequency signal having a specified frequency;
    a transmission modulation means for modulating a transmission signal based on a frequency of the fixed frequency signal;
    a third local oscillation means for generating a third signal having a frequency within a specified range;
    a transmission signal output means which changes a frequency output from the transmission modulation means to a sum or a difference between a frequency of the third signal and a frequency output from the transmission modulation means and outputs the frequency in accordance with a type of the transmission signal;
    a plurality of reception demodulation means which is provided for reception signal types and demodulates the reception signal based on a reception demodulation frequency;
    a fourth local oscillation means for generating a fourth signal having a frequency within a specified range; and
    a reception demodulation frequency output means for supplying the reception demodulation frequency to the reception demodulation means based on output of the fourth local oscillation means and the fixed frequency signal.

* * * * *